May 9, 1967   O. G. FOLBERTH   3,318,669
METHOD OF PRODUCING AND RE-MELTING COMPOUNDS AND ALLOYS
Filed June 1, 1961   2 Sheets-Sheet 2

United States Patent Office 3,318,669
Patented May 9, 1967

3,318,669
METHOD OF PRODUCING AND RE-MELTING COMPOUNDS AND ALLOYS
Otto Gert Folberth, Boblingen, near Stuttgart, Germany, assignor to Siemens-Schuckerwerke Aktiengesellschaft, Berlin-Siemensstadt, Germany, a corporation of Germany
Filed June 1, 1961, Ser. No. 114,212
Claims priority, application Germany, June 3, 1960, S 68,808
8 Claims. (Cl. 23—315)

My invention relates to the production of chemical compounds or alloys that contain one or more components more readily volatile than others, and that are produced by melting the components together in a sealed vessel and thereafter permitting the melt to cool and freeze. This can be done according to the so-called two-temperature method, which involves the following two possibilities of maintaining the proper vapor pressure in the sealed vessel above the melt:

(1) The vapor pressure is controlled above a residual body of the more volatile component ("bottom body") located at the coldest spot of the sealed processing vessel.

(2) The vapor is maintained without the presence of a bottom body, by dimensioning the weighed-in components so that the vapor pressure in the vessel just attains the desired value when the total quantity of the more volatile component or components is completely evaporated or dissolved in the melt. This requires employing a slight, properly dimensioned excess amount of the more volatile component above the stoichiometric composition. This method is described in the copending application of O. G. Folbert, et al., Serial No. 534,852, filed September 16, 1955, assigned to the assignee of the present invention, and is also known from German Patent 1,029,803.

A pre-requisite for the applicability of these two methods is that the components can clearly be ranged into two groups, namely: less volatile components which boil at a relatively high temperature, and more volatile components which boil at a relatively low temperature; the components of these two groups having respective vapor pressures and respective rates of evaporation which, at the same temperature, differ from each other in order of magnitude, and forming no intermediate kinds of molecules that exhibit intermediate values of vapor pressure and rate of evaporation. Such a sufficiently distinctive behavior is not observed with compounds and mixed crystals (solid solutions) which contain zinc or cadmium, aside from very readily volatile components—such as arsenic and phosphorus, for example—and considerably less volatile components—such as indium, gallium, tin and germanium, for example. A two-temperature method of the above-mentioned kind then encounters the following difficulties:

Due to the slight differences in vapor pressure, the two characteristic temperatures are so close to each other as to prevent a simple and reliable processing in the above-described manner. In such cases, generally, precipitations occur in the processing vessel that can be controlled only with difficulty, so that the pre-requisites for a satisfactory two-temperature method are no longer satisfied.

To avoid such difficulties, a one-temperature method could conceivably be employed. According to this method, the components are melted together within a sealed vessel which is everywhere exposed to uniform temperature. This prevents the occurrence of two or more liquid phases which are not fully in equilibrium with each other. Thus, by means of a simple program of temperature control, the desired solid body can be obtained. On the other hand, methods of this type exhibit grave disadvantages:

(1) During heating, a hard crust may form at the surface of the melt so that the remainder of the more volatile component can no longer react with the melt. This causes the vapor pressure to increase at increasing temperature, with the result that in some cases an explosion will take place, particularly when arsenic or phosphorus are used as the more volatile component.

(2) In most cases the slow cooling of the melted substance in the furnace results in an unoriented microcrystalline, and very inhomogeneous texture.

(3) The one-temperature method does not afford any re-melting operation, such as zone-melting, pulling a monocrystal with the aid of a crystal seed, and similar processing methods, because the phase boundaries between the solid and liquid state cannot be displaced in a controlled manner.

It is an object of my invention to devise an improved method of producing and re-melting chemical compounds or alloys of the above-mentioned type without requiring the above-mentioned distinct separation of the components into two groups, namely, less volatile and considerably more volatile components.

More particularly, it is an object, subsidiary to the one just mentioned, of providing a method for the production of a compound or alloy, including mixed crystals, in crystalline form by melting the components together within a closed and sealed processing system, with a vapor phase of at least one elemental component being essentially active in the production process.

According to my invention, the components to be melted together are first placed into a processing vessel in properly weighed quantities, substantially in accordance with the two-temperature method mentioned above. After sealing the vessel, only the lower portion of the vessel is heated up to the melting temperature of the compound or alloy to be produced. Thereafter, the remainder of the melting vessel is continuously and slowly brought up to the same temperature; and thereafter the melt is permitted to progressively freeze from one end to the other.

The method according to the invention is particularly favorable for the production of mixed crystals of the type

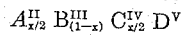

These are alloys consisting of respective elements from the second, third, fourth and fifth groups of the Periodic System.

The invention is also applicable to particular advantage for the production of mixed crystals of the type

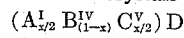

These are alloys of respective elements from the first, fourth, fifth, and sixth groups of the Periodic System. The method of the invention is particularly superior to those heretofore available, when phosphorus or arsenic or both constitute a component of the substance to be produced.

Multicomponent compounds of the type $A^{III}\ B^V$ as disclosed by myself and another in copending coassigned application Serial No. 534,852 filed September 16, 1955 and compounds of the type $A^I\ B^V$ can also be advantageously prepared by my method as disclosed herein.

The method according to the invention is applicable not only for the production of compounds and alloys from components of the above-described type, but is also suitable for the re-melting of such compounds or alloys, particularly for re-melting with unoriented freezing, for zone-melting or for the growing of monocrystals.

The application of the method according to the invention in practice will be explained below with reference to the drawings in which.

Figure 1A:
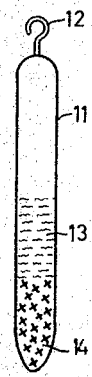
FIGS. 1a to 1e illustrate five different stages of the method.

Shown in FIG. 1a is the melting vessel 11, which in this case consists of an elongated ampule made, for example, of quartz glass. The bottom portion of the ampule is drawn out to form a point, and a hook 12 is attached to, or formed at, the top. After the components to be melted together are placed into the vessel, it is sealed by fusing in high vacuum or protective gas. The readily volatile components 13 may then be located above the less volatile components 14, for example. For good mixing of the less volatile components, if several such components are present, it is of advantage to first produce a pre-alloy of the less volatile components and to then place the pre-alloy, preferably into the melting vessel. For better mixing, the less volatile components may also first be pulverized or granulated, then mixed and thereafter placed into the melting vessel.

Figure 1B:
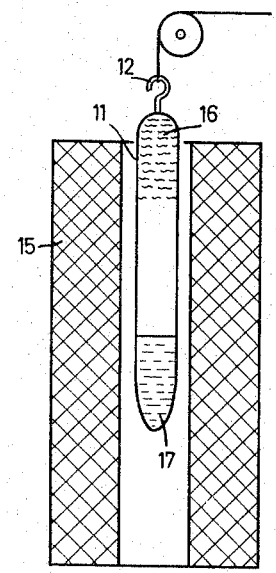
Figure 1C:
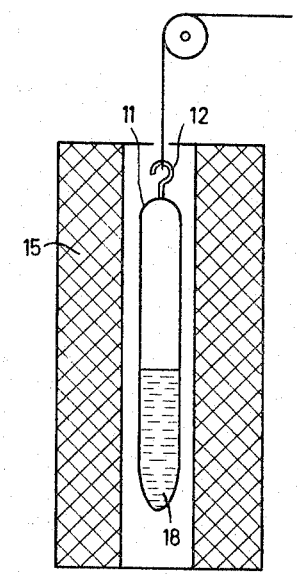

After the melting vessel is provided with the proper amounts of components and sealed off in the above-described manner, it is placed into a vertical, cylindrical tubular furnace 15 as shown in FIG. 1b so that a portion of the melting vessel protrudes upwardly from the furnace. Then the furnace is controlled and regulated to provide the required melting temperature. The more volatile components commence to evaporate and precipitate in solid or liquid form at 16 in the upwardly protruding, relatively cold portion of the melting vessel. When the melting temperature is reached, the less volatile components form a melt 17 in the bottom portion of the vessel. After the less volatile components are completely melted, the vessel, according to FIG. 1c is slowly lowered down to the middle of the furnace.

If a solid crust is formed on the surface of the melt, the lowering motion must be immediately discontinued and the temperature must be increased until the crust is again dissolved. The more volatile components become gradually dissolved in the melt without the possibility that a dangerous excessive pressure can occur at any time. After termination of this first portion of the process, the entire melting vessel has assumed the same temperature and contains only the melt 18 and the vaporous phase, without any other residue.

Figure 1D:
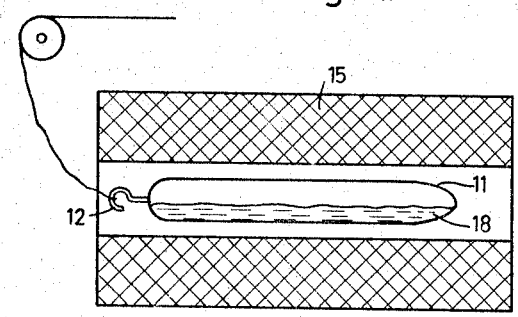
Figure 1E:
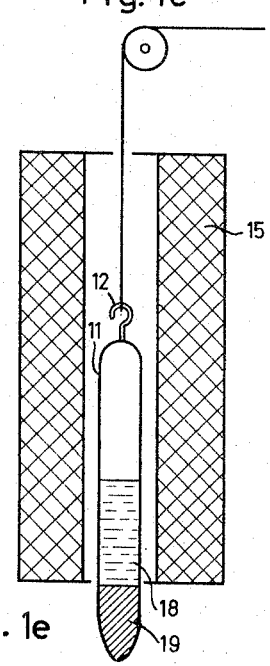

In order to obtain a completely homogeneous melt, it is of advantage to tilt the furnace with the melting vessel by 90°, as shown in FIG. 1d, and to thoroughly shake the melt 18 by shaking the vessel. Thereafter, the furnace is returned to the normal position shown in FIG. 1e, and the melting vessel is slowly moved downwardly out of the furnace under continuous shaking or vibrating at a small amplitude. The melt commences at 19 to freeze from below in the upward direction in an orientated manner (normal freezing). The production process is completed when the melting vessel is fully run out of the furnace in the manner just described.

When using phosphorus as a more volatile component, its slight adhesion to the wall of the melting vessel is particularly disadvantageous. The phosphorus, precipitated in solid or liquid form, glides downward from the cold zone of the melting vessel along the vessel wall into the hot zone where it evaporates. This may cause an undesirably high vapor pressure. In order to prevent this, it is advisable to give the melting vessel a particular shape or to tilt the heating furnace and the melting vessel in such a manner that the phosphorus can no longer glide off the wall of the melting vessel.

Figure 2:
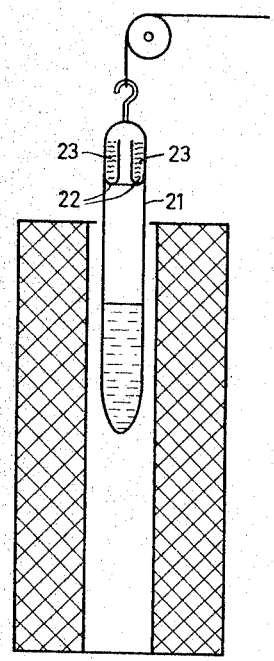
FIG. 2 shows a special design of the melting vessel particularly applicable when phosphorus constitutes the readily volatile component.

In the embodiment shown in FIG. 2, the upper portion of the melting vessel 21 is provided with an internal, pouch-like (pocket shaped) container 22 in which the more volatile components 23, for example phosphorus, can precipitate. This shape of the melting vessel prevents the more volatile components from gliding downwardly into the hotter zone.

Figure 3:
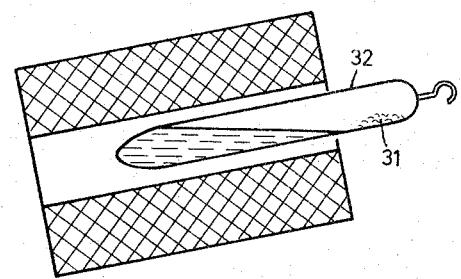
FIG. 3 shows a particular arrangement of the melting furnace and the melting vessel for use of phosphorus as the readily volatile component.

The gliding of the components, precipitated in liquid or solid form, can also be prevented by a particular arrangement of the tubular furnace and the melting vessel, such as illustrated in FIG. 3 by example. The angle of inclination of the entire arrangement is preferably so chosen that the precipitate 31 of the components remains adherent in the colder portion of the melting vessel 32, whereas the melt fills only the hot portion of the vessel.

In all other respects, particularly relative to the quantities of the components to be filled into the vessel, the process can be carried out in the same manner as described in the above-mentioned copending application Ser. No. 534,852, as will be apparent from the following examples.

*Example I*

Production of the mixed crystal

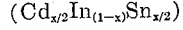

$(Cd_{x/2}In_{(1-x)}Sn_{x/2})$ as, with $x=0.8$. Weighed-in amounts: indium 7.600 g., cadmium 14.885 g., tin 15.720 g., arsenic 24.800 g. plus 50 milligrams excess.

Indium, cadmium and tin are weighed under argon protective gas and are then melted at about 400° C., also under the protective gas. In this manner, a pre-alloy is produced. The pre-alloy is pulverized and placed into the ampule. After adding arsenic, the ampule is heated, sealed-off and provided with a hook in the above-described manner. Now the lower portion of the ampule was placed into the furnace (FIG. 1b). The furnace temperature was kept at 970° C. The pre-alloy melts. The arsenic evaporated and sublimated in the ampule portion protruding upwardly out of the furnace. Thereafter, the ampule was lowered in accordance with FIG. 1c at a rate of about 5 cm./h. The arsenic again evaporated and could penetrate into the melt. The furnace with the ampule was then turned to horizontal position (FIG. 1d) and carefully subjected to teetering motion in order to obtain a homogeneous melt. Thereafter the furnace was returned to vertical position (FIG. 1e) and the ampule was lowered at the rate of about 5 cm./h. The specimen in the ampule was thus subjected to freezing from its bottom toward the top. The result was the above-mentioned mixed crystal with $x=0.8$.

*Example II*

Production of $Cu_3P$. Weighed-in amounts: copper 6.159 g., phosphorus 1.000 g., $+30$ milligrams excess.

The components were placed into a vessel as shown in FIG. 2 and were sealed in the vessel in the manner described above. The vessel had a length of 12 cm. It was slowly lowered into the furnace at a temperature kept somewhat above 1100° C. After formation of the melt, the ampule was vibrated for about 1 hour for the purpose of homogenizing the melt. Thereafter the ampule was lowered out of the furnace in the above-described manner. The specimen froze to form a solid body of $Cu_3P$.

*Example III*

Production of

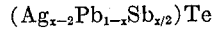

$(Ag_{x-2}Pb_{1-x}Sb_{x/2})Te$ with $x=0.8$. Weight amounts: silver 6.1197 g., lead 5.8771 g., antimony 6.9056 g., tellurium 18.0970 g., plus 100 milligrams excess.

The furnace was heated to about 1000° C. This is higher than the temperature at which solidification commences, the latter temperature being at about 580° C. With the furnace at 1000° C., the ampule of 20 cm. length, provided with the above-mentioned components, were slowly moved into the furnace. The high furnace temperature promotes the melting of the silver. The fused-off ampule was slowly lowered into the furnace and the entire amount of components contained therein were thus converted to a melt which at this high temperature was a very thin liquid. The furnace was then turned 90° (FIG. 1d) and subjected to teetering motion in order to further homogenize the melt. Thereafter the ampule was lowered out of the furnace at a rate of about 6 cm./h. The resulting product was a homogeneous rod which exhibited large monocrystalline regions.

*Example IV*

Production of $In(P_xAs_{(1-x)})$, with $x=0.2$. Weighed amounts: indium 1.148 g., arsenic 0.599 g., plus 6 milligrams excess, phosphorus 0.620 g., plus 6 milligrams excess.

The indium was first placed into an ampule of 15 cm. length. Thereafter the arsenic was added, and ultimately the red phosphorus. After the ampule was sealed-off, it was inserted from above into the furnace to about half of its length. The furnace was inclined approximately 15° relative to the horizontal and was kept at a temperature of about 1100° C. in order to permit the evaporating substances to immediately react with the indium-rich melt, without causing the melt to become coated with a crust of indium arsenide or indium phosphide. All components of the specimen remained liquid or vaporous up to the complete formation of the melt. The melt was homogenized by teetering the ampule. The ampule was thereafter lowered out of the furnace at approximately the same rate as in the preceding examples, and was thereby cooled slowly by orientated or normal freezing. The resulting product consisted of mixed crystals with only slight differences in concentration.

The chemical compounds and alloys as prepared herein are suitable as electronic semiconductors for the production of electronic semi-conductor devices including thermoelectric materials.

I claim:

1. A method for the production of a compound in crystalline form by melting the components together within a sealed melting vessel, with a vaporous phase of at least one elemental component being contained in the vessel and coacting in the formation of said compound, comprising the steps of initially heating the lower portion of said sealed melting vessel to the melting temperature of said compound, thereafter continuously and slowly bringing the remainder of the melting vessel up to the same temperature to produce a uniform melt, and thereafter permitting the melt to progressively freeze from bottom to top.

2. A method for the production of a compound in crystalline form by melting the components together within a sealed melting vessel, with a vaporous phase of at least one elemental component being contained in the vessel and coacting in the formation of said compound, which comprises the steps of introducing an already produced pre-alloy of the less volatile components into a melting vessel, introducing the more volatile component into said vessel, sealing said vessel, initially heating only the lower portion of said sealed melting vessel, slowly bringing the remainder of said sealed melting vessel to the same temperature as said lower portion to produce a uniform melt, and thereafter permitting the melt to progressively freeze from bottom to top.

3. A method for producing crystals of the type $$(A^{II}_{x/2}B^{III}_{(1-x)}C^{IV}_{x/2})D^{V}$$

where $A^{II}$, $B^{III}$, $C^{IV}$, and $D^{V}$ respectively represent elements from the second, third, fourth, and fifth groups of the Periodic System and $x$ is not greater than one, which comprises the steps of placing said elements into a reaction vessel, sealing said vessel, initially heating only the lower portion of said sealed melting vessel, slowly bringing the remainder of said sealed melting vessel to the same temperature as said lower portion to produce a uniform melt, and thereafter permitting the melt to progressively freeze from bottom to top.

4. A method for producing crystals of the type $$(A^{I}_{x/2}B^{IV}_{(1-x)}C^{V}_{x/2})D^{VI}$$

where $A^{I}$, $B^{IV}$, $C^{V}$, and $D^{VI}$ respectively represent elements Periodic System and $x$ is not greater than one, which comprises the steps of placing said elements into a reaction vessel, sealing said vessel, initially heating only the lower portion of said sealed melting vessel, slowly bringing the remainder of said sealed melting vessel to the same temperature as said lower portion to produce a uniform melt, and thereafter permitting the melt to progressively freeze from bottom to top.

5. A method of producing mixed crystals of $$(Cd_{x/2}In_{(1-x)}Sn_{x/2})$$

As, where $x$ is not greater than one, which comprises the steps of placing said elements into a reaction vessel, sealing said vessel, initially heating only the lower portion of said sealed melting vessel to a temperature about 970° C., slowly bringing the remainder of said sealed melting vessel to the same temperature as said lower portion to produce a uniform melt, and thereafter permitting the melt to progressively freeze from bottom to top.

6. A method of producing $Cu_3P$ which comprises the steps of placing weighed amounts of copper and phosphorus into a reaction vessel having an internal pocket near the upper portion of said vessel, sealing said vessel, initially heating only the lower portion of said sealed melting vessel, slowly bringing the remainder of said sealed melting vessel to the same temperature as said lower portion to produce a uniform melt, agitating the heated vessel and thereafter permitting the melt to progressively freeze from bottom to top.

7. A method for producing mixed crystals of $$(Ag_{x/2}Pb_{(1-x)}Sb_{x/2})Te$$

where $x$ is not greater than one, which comprises the steps of placing said elements into a reaction vessel, sealing said vessel, initially heating only the lower portion of said sealed melting vessel, slowly bringing the remainder of said sealed melting vessel to the same temperature as said lower portion to produce a uniform melt, turning the heated vessel 90°, so that said vessel is horizontal, permitting teetering said horizontal vessel, returning said vessel to the vertical and thereafter permitting the melt to progressively freeze from bottom to top.

8. A method for producing mixed crystals of $$In(P_xAs_{(1-x)})$$

where $x$ is not greater than one, which comprises the steps of placing said elements in a reaction vessel, sealing said vessel, initially heating only the lower portion of said sealed melting vessel to a temperature of about 1100° C., inclining said vessel 15° from the horizontal, slowly bringing the remainder of said sealed melting vessel to the same temperature as said lower portion to produce a uniform melt, and thereafter permitting the melt to progressively freeze from bottom to top.

References Cited by the Examiner

UNITED STATES PATENTS

| | | | |
|---|---|---|---|
| 2,862,787 | 12/1958 | Seguin et al. | 23—14 |
| 2,882,467 | 4/1959 | Wernick | 23—14 |
| 2,944,975 | 7/1960 | Folberth | 23—14 |

OSCAR R. VERTIZ, *Primary Examiner.*

MAURICE A. BRINDISI, *Examiner.*

M. N. MELLER, H. S. MILLER, *Assistant Examiners.*